United States Patent

[11] 3,614,498

[72] Inventors Henning Bank;
Per-Owe Jilsen; Hans Klein; Tage Persson, all of Vasteras, Sweden
[21] Appl. No. 89,610
[22] Filed Nov. 16, 1970
[45] Patented Oct. 19, 1971
[73] Assignee Allmanna Suenska Elektriska Aktiebolaget Vasteras, Sweden

[54] WINDING COIL SUPPORT MEANS
6 Claims, 3 Drawing Figs.
[52] U.S. Cl. .................................... 310/262, 310/270
[51] Int. Cl. ..................................... H02k 3/50
[50] Field of Search ............................ 310/270, 262, 260, 64, 55, 61

[56] References Cited
UNITED STATES PATENTS
| 2,724,064 | 10/1955 | Kilner | 310/61 |
| 2,796,540 | 6/1957 | Barlow | 310/61 |
| 3,458,742 | 7/1969 | Whitelaw | 310/270 |

Primary Examiner—D. X. Sliney
Attorney—Jennings Bailey, Jr.

ABSTRACT: A rotor of a turbogenerator has a winding coil support which includes a retaining ring surrounding the coil ends of the rotor winding and shrunk onto the rotor body and onto a support ring arranged in the rotor body axially outside the coil ends. The support ring is formed by at least four coaxial metal rings arranged axially one after the other and radially gripped by the rotor body and the retaining ring.

PATENTED OCT 19 1971 3,614,498

INVENTOR.
HENNING BANK, PER-OWE
BY JILSSON, HANS
KLEIN, TAGE PERSSON
Jennings Bailey, Jr.

WINDING COIL SUPPORT MEANS

BACKGROUND OF THE INVENTION

1. Field of the Invention

The present invention relates to a winding coil support means for the rotor of a turbogenerator comprising a retaining ring which surrounds the coil ends of the rotor winding and which at one end is shrunk onto the rotor body, whereas at the other end it is shrunk onto a support ring arranged on the rotor body axially outside the coil ends.

A winding coil support means according to the invention is principally intended for a turborotor having directly liquid-cooled windings.

2. The Prior Art

It is known to use a so-called flying support ring, that is a support ring which is only fixed to the rest of the rotor by means of its shrinkage fit with the retaining ring (U.S. Pat. No. 3,254,246).

It is also known to use a support ring which with its radially inner cylinder surface exerts a pressure on the rotor body (U.S. Pat. No. 3,030,530). The support ring shown in the latter patent is split into two parts arranged axially next to each other, for reasons of assembling.

Particularly with liquid-cooled machines, it is important that the position of the coil ends does not alter upon variations in speed as this would cause damaging stresses on the hydraulic connections. With conventional support ring designs the centrifugal force at normal speeds causes considerable deformation of the retaining ring and corresponding alterations of position of the coil ends.

Quite generally it is known to avoid deformation of a rotating hollow cylinder by giving it such a degree of prestressing that the tension at standstill is substantially equal to (and oppositely directed to) the stress caused by the centrifugal force. However, it is impossible to achieve such a high degree of prestressing in the rotor retaining-ring if it is not provided with a support ring resting against the shaft pin. Even if such a support ring is used (for example as in the above-mentioned U.S. Pat. No. 3,030,530) it is impossible with conventional constructions to achieve such high prestressing of the retaining ring that the dimensions are sufficiently stable under the influence of the centrifugal force, or rather such prestressing cannot be permitted since a shrinkage fit between the outer end of the retaining ring, support ring and rotor body might then give rise to other disadvantages more complicated than those to be avoided. There is, for instance, a strong axial contraction when the retaining ring is shrunk on, as it cools. When the speed is increased from zero to full speed there is a contraction tendency in the longitudinal direction due to the radial expansion which takes place at the center part of the retaining ring (since the prestressing is considerably less here than at the ends, and during operation the retaining ring varies in length due to varying heat development in the rotor winding, rotor and retaining ring. If these axial alterations in dimension are counteracted by a rigid mechanical connection at the outer ends of the retaining ring, there is a risk of destruction owing to excessive shearing stress in the shrunk surfaces. Furthermore, a bending moment affecting the rotor will no longer result in the calculated bending stresses determined by the shape of the rotor body, but a considerable increase in stress will occur at the support ring.

SUMMARY OF THE INVENTION

With a winding coil support means according to the invention the coil ends are retained with sufficient position stability and at the same time the above-mentioned disadvantages are avoided.

This is achieved by designing the support ring in such a way that it is rigid for radial forces, but yields to axial forces and to a bending moment operating on the shaft.

A means according to the invention is characterized in that the support ring comprises at least four coaxial metal rings, each of which is radially clamped between the rotor body and the retaining ring.

The invention will be described in the following with reference to the accompanying drawings in which FIG. 1 shows an axial section of part of the rotor in a turbogenerator and FIG. 2 shows the rotor in a section along the line A-A in FIG. 1.

FIG. 3 shows an axial section of an embodiment of a support ring according to the invention.

DESCRIPTION OF THE PREFERRED EMBODIMENTS

Figure 1:
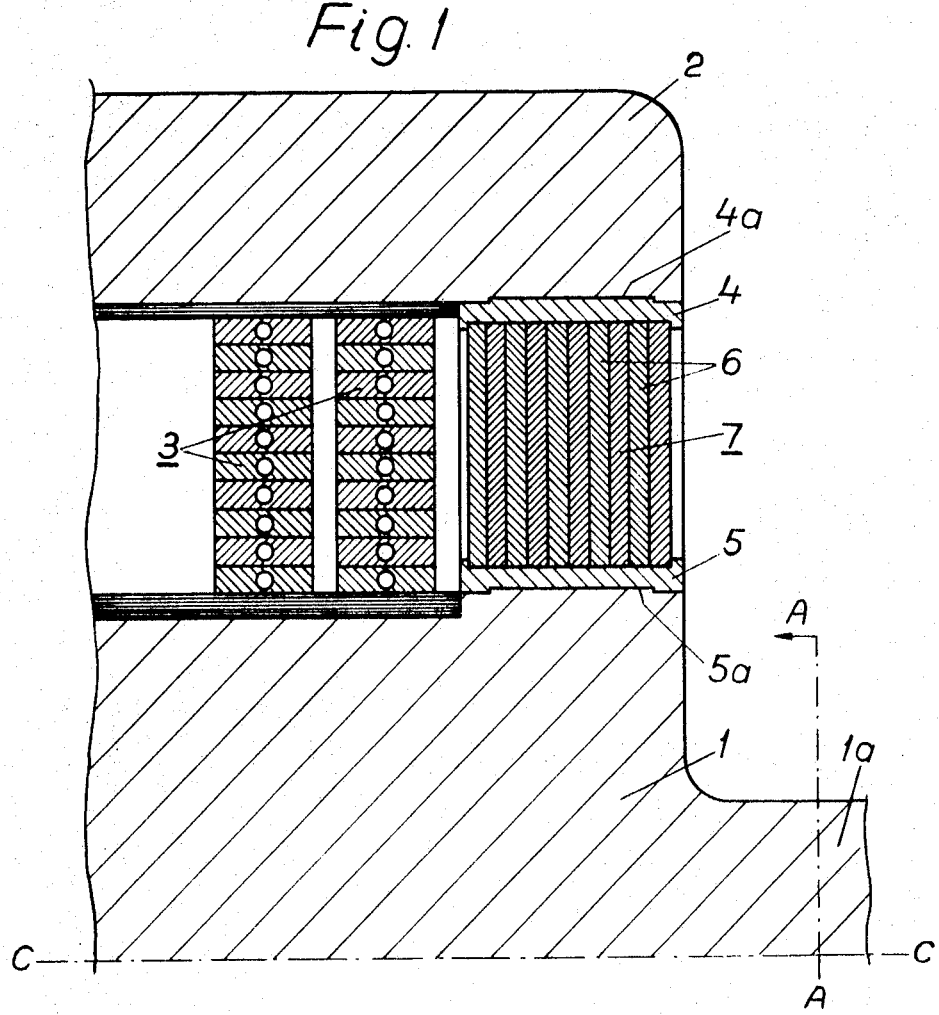
Figure 2:
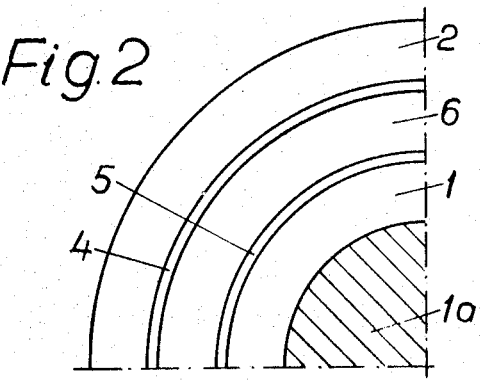

In the drawings 1 designates the rotor body and 2 the axially outer part of a retaining ring, the axially inner end of which has been shrunk onto the rotor body in the same way as the retaining rings in the above-mentioned U.S. patent. The retaining ring surrounds the coil ends 3 of the rotor. A support ring 7 tightly surrounding the rotor body is arranged axially outside the coil ends 3 and the retaining ring 2 is shrunk onto the support ring 7 with strong prestressing. The support ring consists of ten metal rings 6 arranged axially one after the other and held together by means of the hollow cylinders 4 and 5. Each cylinder 4 and 5 is provided with a peripherally running groove to take up the metal rings 6. The cylinder 4 is locked in axial direction in relation to the retaining ring and the cylinder 5 in relation to the rotor body by means of groove/projection connections 4a and 5a, respectively.

Figure 3:
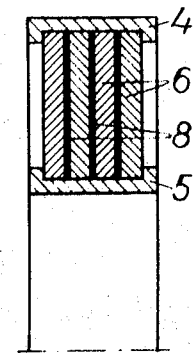

In the support ring shown in FIG. 3 the metal rings 6 are separated by means of layers 8 of a relatively yielding material, for example lead. The object of the layers 8 is to reduce friction between the rings 6. Friction-reducing layers of, for example, teflon may also be used.

We claim:

1. Winding coil support means for the rotor of a turbogenerator comprising a retaining ring (2) which surrounds the coil ends (3) of the rotor winding and which at one end is shrunk onto the rotor body (1) whereas at the other end it is shrunk onto a support ring (7) arranged on the rotor body axially outside the coil ends, in which the support ring comprises at least four coaxial metal rings (6) arranged axially one after the other, each of which is radially clamped between the rotor body and the retaining ring.

2. Means according to claim 1, having two hollow cylinders (4,5) arranged at the outer and inner edges, respectively, (4a, 5a)for the rings holding the rings together.

3. Means according to claim 2, in which at least one of said hollow cylinders has at least one peripheral groove for said metal rings.

4. Means according to claim 2, in which at least one of said hollow cylinders is provided with means 4a, 5a) for preventing axial movement of the rings in relation to rotor parts abutting the support ring.

5. Means according to claim 1, having layers of relatively yielding material separating the rings from each other.

6. Means according to claim 1, in which the metal rings are provided with surface layers of friction reducing material.

UNITED STATES PATENT OFFICE
CERTIFICATE OF CORRECTION

Patent No. 3,614,498　　　　　　　　　Dated October 19, 1971

Inventor(s) Henning Bank; Per-Owe Jilsen; Hans Klein; and Tage Persson

It is certified that error appears in the above-identified patent and that said Letters Patent are hereby corrected as shown below:

After the Heading, insert:

Claims Priority, Application Sweden,
November 17, 1969, 15700/69

Signed and sealed this 10th day of July 1973.

(SEAL)
Attest:

EDWARD M. FLETCHER, JR.　　　　　　　Rene Tegtmeyer
Attesting Officer　　　　　　　　　　Acting Commissioner of Patents